(12) United States Patent
Wedeward

(10) Patent No.: US 6,991,009 B1
(45) Date of Patent: Jan. 31, 2006

(54) WORK SURFACE GUIDE FOR POWER TOOLS

(76) Inventor: William Wedeward, 3610 Johns St., Madison, WI (US) 53714

( * ) Notice: Subject to any disclaimer, the term of this patent is extended or adjusted under 35 U.S.C. 154(b) by 123 days.

(21) Appl. No.: 10/733,629

(22) Filed: Dec. 11, 2003

(51) Int. Cl.
- *B27C 5/04* (2006.01)
- *B26D 5/00* (2006.01)
- *B27B 11/02* (2006.01)

(52) U.S. Cl. ............... 144/144.1; 144/145.2; 144/154.5; 83/574; 83/743; 83/468.4

(58) Field of Classification Search ............... 144/48.6, 144/144.1, 144.41, 144.51, 144.52, 145.1, 144/145.2, 154.5; 83/745, 743, 574, 468.3, 83/468.4; 409/181, 182
See application file for complete search history.

(56) References Cited

U.S. PATENT DOCUMENTS

| | | | |
|---|---|---|---|
| 3,368,594 A | 2/1968 | Drumbore | |
| 3,741,063 A | 6/1973 | Bretthauer | |
| 3,983,776 A | 10/1976 | Flanders | |
| D245,668 S | 9/1977 | Bretthauer | |
| 4,050,340 A | 9/1977 | Flanders | |
| 4,320,678 A | 3/1982 | Volk | |
| 4,350,066 A | 9/1982 | Volk | |
| 4,378,716 A | 4/1983 | Volk | |
| 4,453,438 A | 6/1984 | Zelli | |
| 4,489,634 A | 12/1984 | Volk | |
| 4,519,280 A * | 5/1985 | Cook | 83/34 |
| 4,660,450 A | 4/1987 | Rafalow | |
| 4,840,097 A * | 6/1989 | Campbell | 83/829 |
| 4,916,994 A | 4/1990 | Hatala | |
| 6,116,304 A | 9/2000 | Wilson et al. | |
| 6,484,767 B2 * | 11/2002 | Cameron | 144/154.5 |
| 2003/0145706 A1 * | 8/2003 | Jordan | 83/468.4 |

* cited by examiner

*Primary Examiner*—Derris H. Banks
*Assistant Examiner*—Shelley Self
(74) *Attorney, Agent, or Firm*—Craig A. Fieschko, Esq.; DeWitt Ross & Stevens S.C.

(57) ABSTRACT

A work surface guide for portable hand-operated power tools allows their adaptation to a fixed-bed form (for example, a circular saw may be used as a radial arm saw or sliding miter saw). A pair of parallel rails are spaced laterally outwardly and above a table or other work surface so that the power tool may slide along these rails to cut matter located in a cutting area situated below and beneath the rails (and protruding from the edge of the work surface beneath the rails). A board fence is pivotally attached to one of the rails to extend onto the work surface, thereby allowing the board fence to be adjusted to some desired angle, a board to be situated against the board fence to protrude beneath the rails and into the cutting area, and the power tool to be run along the rails to cut the board.

20 Claims, 2 Drawing Sheets

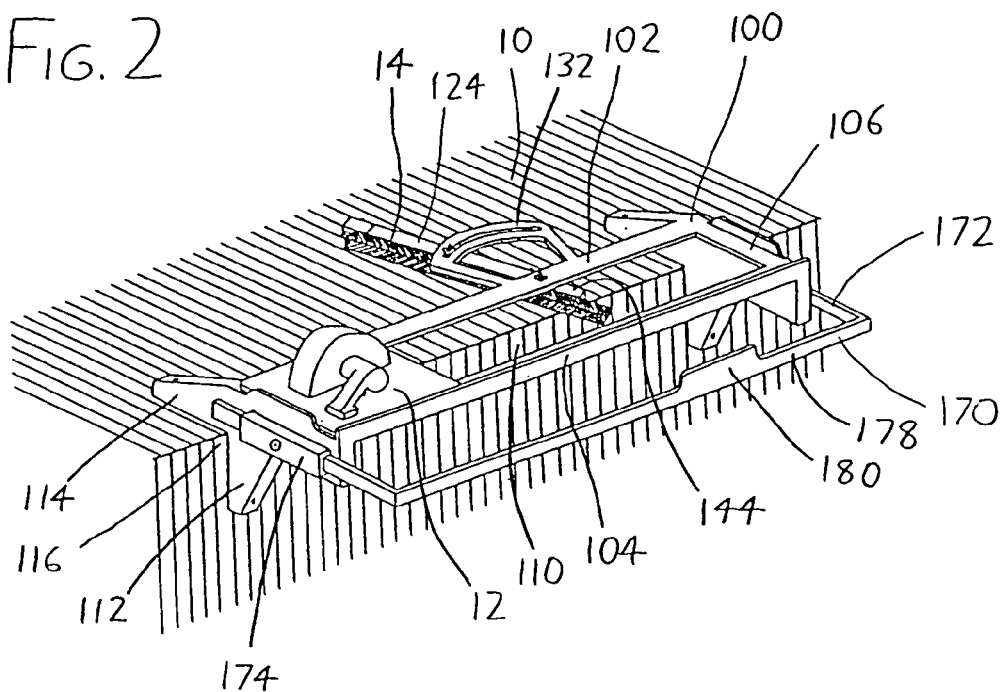
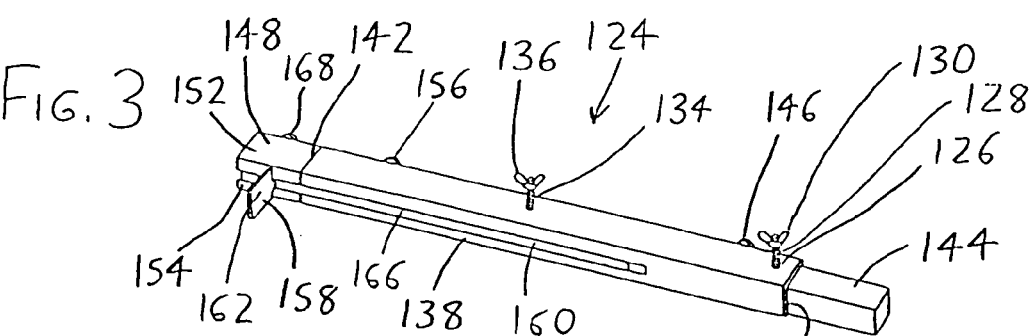
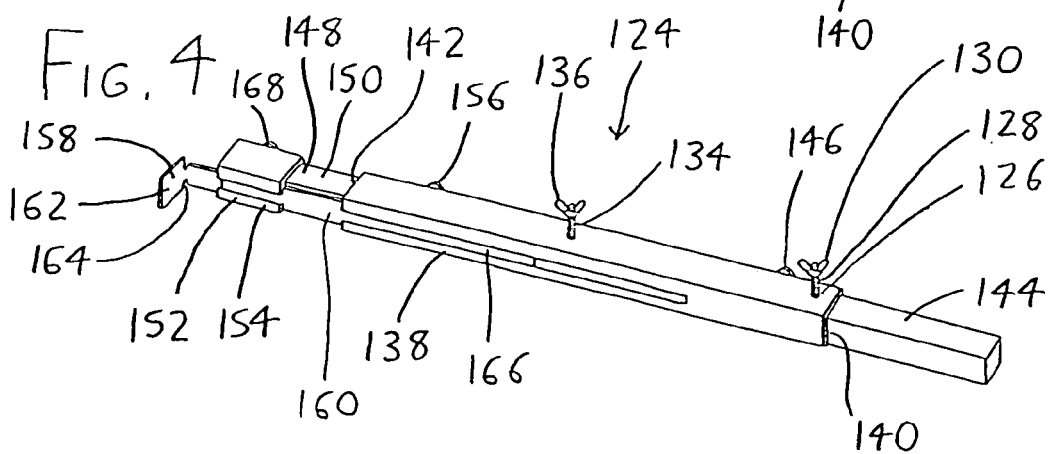

WORK SURFACE GUIDE FOR POWER TOOLS

FIELD OF THE INVENTION

This document concerns an invention relating generally to devices for mounting and guiding power tools with respect to workpieces, and more specifically to an adapter which receives common hand-held power tools and allows them to be operated in a manner similar to larger "fixed bed" power tools (e.g., it allows a common hand-held circular saw to be adapted for use as a radial arm saw or sliding miter saw).

BACKGROUND OF THE INVENTION

In fields such as construction and woodworking, users often make use of portable hand-held power tools (such as circular saws, jigsaws, routers, etc.), and/or larger "fixed-bed" power tools (such as table saws, radial arm saws, bandsaws, and table routers). While the hand-held power tools are popular for their portability and versatility (and additionally their low cost), the more cumbersome and expensive fixed-bed tools are often preferred for a more "professional" job, generally owing to their ability to very precisely position a workpiece with respect to the power tool head (e.g., the saw blade, router head, etc). However, fixed-bed tools must generally be used in a fixed location owing to their bulk and weight. It would be useful to have available some means for adapting common hand-held power tools so that they may be used in the same manner as their "fixed-bed" equivalents (for example, to allow a hand-held circular saw to be used as a radial arm saw or sliding miter saw).

SUMMARY OF THE INVENTION

The invention involves a work surface guide for power tools which is intended to at least partially solve the aforementioned problems. To give the reader a basic understanding of some of the advantageous features of the invention, following is a brief summary of a preferred version of the work surface guide, which is illustrated in the accompanying drawings. As this is merely a summary, it should be understood that more details regarding the preferred versions may be found in the Detailed Description set forth elsewhere in this document. The claims set forth at the end of this document then define the various versions of the invention in which exclusive rights are secured.

Referring to FIGS. 1 and 2, a preferred version of the work surface guide 100 includes an elongated inner guide rail 102 and an elongated outer guide rail 104 aligned at least substantially parallel to the inner guide rail 102. A power tool (e.g., the circular saw 12 shown in FIG. 2) may slide or otherwise ride on the inner and outer guide rails 102 and 104 so that its cutting head extends between the guide rails 102 and 104 into a cutting area 110 defined below and between the guide rails 102 and 104. Opposing spaced frame members 106 support the guide rails 102 and 104 and extend downwardly to terminate in frame member attachment ends 108 which are adapted to affix to a mounting surface (e.g., to a table 10 as shown in FIG. 2) to support the guide rails 102 and 104 in a plane spaced above the plane of the mounting surface. This is preferably done by having each frame member attachment end 108 include a downwardly extending vertical leg 112, and a horizontal leg 114 extending from the vertical leg 112 (and away from the inner and outer guide rails 102 and 104), so that the vertical and horizontal legs 112 and 114 define a mounting mouth 116 which can receive a corner edge of a mounting surface 10 therein (e.g., with the horizontal leg 114 resting atop the mounting surface 10 and the vertical leg 114 abutting side surface of the corner edge of the mounting surface 10). The frame members 106 thereby support the guide rails 102 and 104 above the mounting surface 10 with the cutting area 110 located adjacent to the corner edge of the mounting surface 10. The frame members 106 include cutting tool end stops 120 extending above the frame members 106, whereby a power tool 12 traveling on the guide rails 102 and 104 travels between the cutting tool end stops 120. Additionally, at least one of the guide rails 102 and 104 preferably includes a cutting tool side stop 122 which extends above the guide rails 102 and 104, whereby a power tool 12 traveling on the guide rails 102 and 104 travels adjacent the cutting tool side stop 122, and may ride against the cutting tool side stop 122 to better ensure that the cutting head of the power tool 12 travels in a path parallel to the guide rails 102 and 104.

An elongated board fence 124 (shown in FIG. 1, and also without the remainder of the work surface guide 100 in FIG. 3) is then pivotally affixed with respect to the inner guide rail 102 to swing between the frame members 106 in planes oriented at least substantially parallel to the inner and outer guide rails 102 and 104, and situated below the inner and outer guide rails 102 and 104 and above the plane of the mounting surface 10. The board fence 124 has opposing planar side surfaces 138 oriented at least substantially perpendicular to a plane defined by the guide rails 102 and 104, whereby a board 14 situated on the mounting surface 10 may be placed against one of these side surfaces 138 to slide against the board fence 124 toward the corner edge of the mounting surface 10 to thereby enter the cutting area 110. The board 14 may then be cut by the cutting head of a power tool 12 traveling on the guide rails 102 and 104.

The board fence 124 includes an inner end 140 facing toward the cutting area 110 and an opposing outer end 142 facing away from the cutting area 110, each of which is adapted to enhance the accurate cutting of boards of different lengths. The inner end 140 of the board fence 124 is adapted to slidably receive a sacrificial elongated cut guide fence member 144 therein, whereby the cut guide fence member 144 may be adjustably extended into the cutting area 110 from the inner end 140 of the board fence 124 (as can be seen from a comparison of FIGS. 3 and 4, wherein FIG. 3 shows the cut guide fence member 144 in a retracted state and FIG. 4 shows it in an extended state). As an example, the inner end 140 of the board fence 124 may be formed of metal tubing sized to complementarily receive a cut guide fence member 144 formed of a length of standard 1×1 (¾ inches by ¾ inches) stock lumber. This allows the cut guide fence member 144 to swing with the board fence 124, and to be extended as desired from the board fence 124 into the cutting area 110 so that when a power tool 12 rides across the guide rails 102 and 104, the end of the cut guide fence member 144 opposite the inner end 140 of the board fence 124 will be cut off. Then, when a user subsequently runs a board 14 against the board fence 124 to situate it in the cutting area 110 for cutting, the user may determine where the cutting head will make the cut on the board 14 by looking to the cut end of the cut guide fence member 144. The user can then align the board 14 against the board fence 124 (and cut guide fence member 144) so that the cut will be made at the desired location on the board 14.

The outer end 142 of the board fence 124 then includes an extension fence member 148 thereon, wherein the extension fence member 148 is adjustably extendable from the outer end 142 of the board fence 124 along the lengthwise axis of the board fence 124 (as can be seen from a comparison of FIGS. 3 and 4, wherein FIG. 3 shows the extension fence member 148 in a retracted state and FIG. 4 shows it in an extended state). The extension fence member 148 has a side surface 154 which is coplanar with the side surface 138 of the board fence 124 against which a board 14 slides during cutting, so that the extension fence member 148 serves as an extension of the board fence 124 which can be adjusted to a desired length with respect to the board fence 124 to better accommodate and guide boards 14 of different lengths.

The board fence 124 and its extension fence member 148 preferably also include a fence board stop 158 extending from the side surface 138 and/or 154 against which the board 14 slides during cutting, so that an end of a board 14 may be situated against the fence board stop 158 to deter it from displacing along its axis during cutting. The fence board stop 158 is relocatable along the lengthwise axis of the board fence 124 and its extension fence member 148 to accommodate boards 14 of different lengths (as can be seen from a comparison of FIGS. 3 and 4, which show the fence board stop 158 in different locations), and is preferably also removable from the board fence 124 to accommodate very long boards 14 (i.e., those which are longer than the maximum length of the board fence 124 and its extension fence member 148).

The work surface guide 100 then preferably also includes an elongated board end stop 170 which is situated adjacent the cutting area 110 in planes oriented between an upper plane defined by the guide rails 102 and 104 and a lower plane defined by the horizontal legs 114 of the frame members 106, with the board end stop 170 extending in a direction oriented between the frame members 106 and at least substantially parallel to the outer guide rail 104. A board 14 to be cut may therefore be slid against the board fence 124 into the cutting area 110 until the end of the board 14 to be cut off abuts the board end stop 170. The board end stop 170 preferably has adjustable spacing with respect to the outer guide rail 104 to accommodate different lengths of boards 14, and is preferably also entirely removable from the work surface guide 100 in case it is not desired (e.g., in the event very long boards 14 are to be cut).

Further advantages, features, and objects of the invention will be apparent from the following detailed description of the invention in conjunction with the associated drawings.

BRIEF DESCRIPTION OF THE DRAWINGS

FIG. 2 is a perspective view of the power tool work surface guide 100 of FIG. 1 shown mounted on a corner edge of a table or other mounting surface 10, with a circular saw 12 situated on the guide rails 102 and 104 of the power tool work surface guide 100 to be pushed towards an end of a board 14 to be cut (this board 14 resting against the board fence 124 of the work surface guide 100).

FIGS. 3 and 4 are perspective views of the board fence 124 of the power tool work surface guide 100 of FIGS. 1 and 2, shown without the remaining structure of the work surface guide 100, and with the cut guide fence member 144, extension fence member 148, and fence board stop 158 shown extended in FIG. 4 from their positions shown in FIG. 3.

DETAILED DESCRIPTION OF PREFERRED VERSIONS OF THE INVENTION

Figure 1:
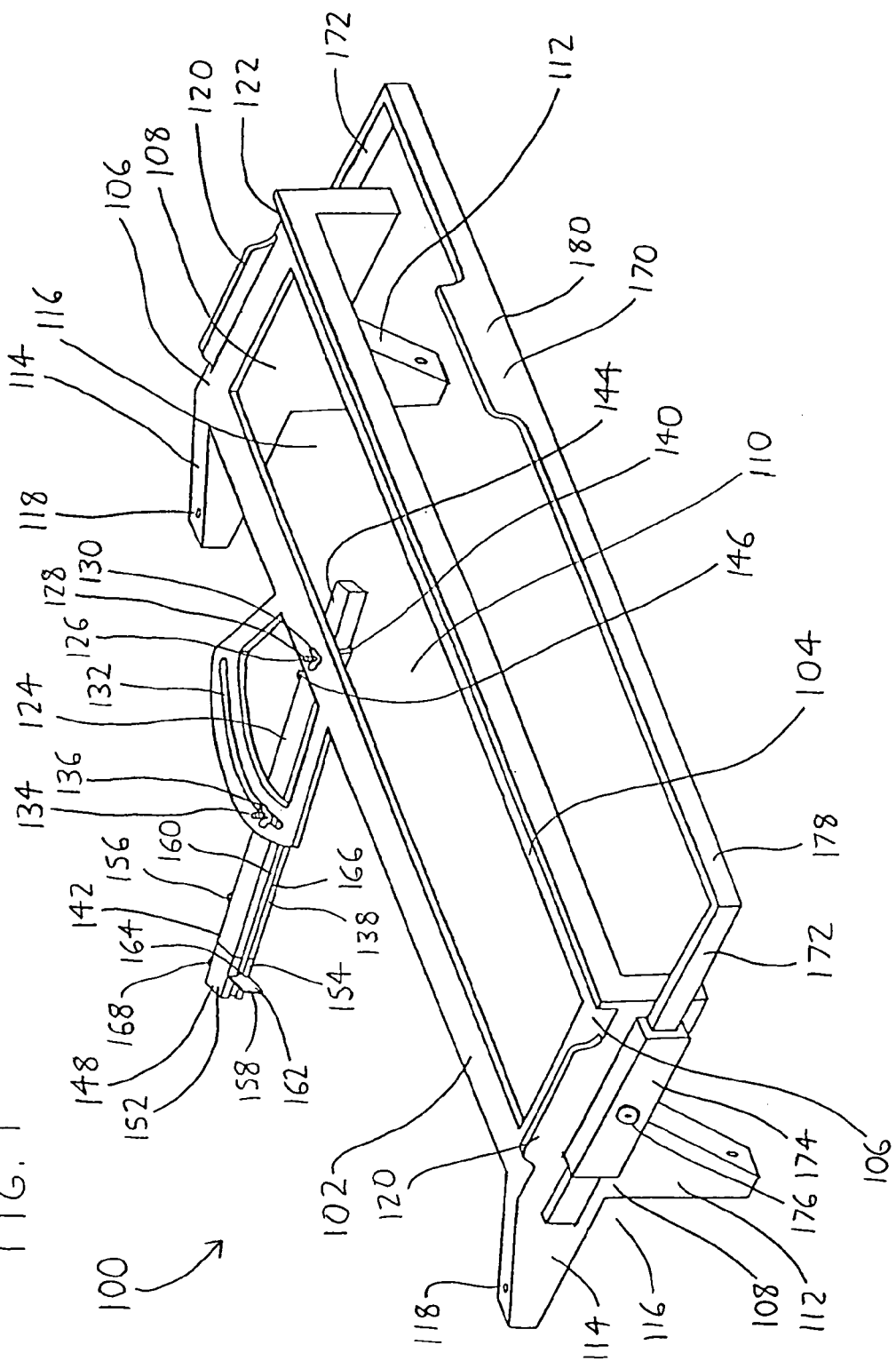
FIG. 1 is a perspective view of a power tool work surface guide 100 which exemplifies the invention.

The reader is directed to FIGS. 1 and 2 of the accompanying drawings, wherein a power tool work surface guide exemplifying the invention is generally designated by the reference numeral 100. The work surface guide 100 includes an elongated inner guide rail 102 and an elongated outer guide rail 104, with the guide rails 102 and 104 being oriented parallel to each other and extending between opposing frame members 106. The frame members 106 are designed to support the guide rails 102 and 104 adjacent to and above a mounting surface such as a workbench or table (generally depicted in FIG. 2 by the reference numeral 10), with the frame members 106 extending downwardly and laterally from the guide rails 102 and 104 to terminate in frame member attachment ends 108. As illustrated in FIG. 2, this allows a power tool such as a circular saw (depicted in FIG. 2 at 12) to rest on the guide rails 102 and 104 with its cutting head (not shown) extending to a cutting area 110 located below and between the guide rails 102 and 104, and adjacent to the edge of the table 10 to which the work surface guide 100 is attached. Thus, by placing a board (such as board 14 in FIG. 2) on the table 10 and extending an end of the board 14 into the cutting area 110, and then driving the circular saw 12 on the guide rails 102 and 104 between the frame members 106, a user may cut the board 14 to some desired length. Note that the guide rails 102 and 104 are shown in the Figures with somewhat greater spacing than might actually be used in practice, so that the cutting area 110 is more clearly visible in the drawings; in general, a spacing between the guide rails 102/104 of 2–4 inches is generally sufficient to accommodate most power tools.

The frame member attachment ends 108 can take a variety of forms, such as some form of jawed mounting arrangement which allows the frame member attachment ends 108 to be readily and removably affixed to the edge of the table 10 (e.g., the frame member attachment ends 108 may be provided in the form of a common C-clamp, a screw-adjusted or spring-loaded jaw, etc.). However, a simple and particularly preferred arrangement is to form the frame member attachment ends 108 with a downwardly extending vertical leg 112, and a horizontal leg 114 extending laterally away from the vertical leg 112 and the guide rails 102 and 104, thereby defining a mounting mouth 116 between the legs 112 and 114. Each of the legs 112 and 114 may then bear at least one leg fastener aperture 118, such that when the edge of the table 10 is situated in the mounting mouth 116 with the vertical and horizontal legs 112 and 114 placed in abutment with the top and side surfaces of the table 10 (as depicted in FIG. 2), fasteners may be inserted into the leg fastener apertures 118 to firmly mount the frame member attachment ends 108 (and thus the frame members 106 and guide rails 102 and 104) to the table 10. To allow the frame member attachment ends 108 to better affix to tables 10 having different configurations, it should be understood that multiple leg fastener apertures 118 situated at different locations on the vertical and horizontal legs 112 and 114 may be provided. Additionally, not all of such leg fastener apertures 118 need bear a fastener which extends into the adjacent table 10; instead, some could bear blunt threaded members which can be threaded into the vertical and horizontal legs 112 and 114 by some desired degree, to extend outwardly therefrom to abut the table 10, and thereby serve as screws for leveling or otherwise finely adjusting the inclination of the work surface guide 100 with respect to the table 10.

While the foregoing configuration of the frame member attachment ends 108 does not allow for significant versatility (in that once the vertical and horizontal legs 112 and 114 are affixed to a table 10, the cutting area 110 is located at the same height above the top of the table 10 and the same location laterally spaced from the edge of the table 10), the height and location of the cutting area 110 can be adjusted by interposing one or more spacer blocks having a desired thickness between the vertical and/or horizontal legs 112 and 114 and the table 10 prior to affixing the legs 112 and 114 to the table 10. If desired, the vertical and horizontal legs 112 and 114 might be provided with an elastomeric or other non-slip surface to better avoid slipping with respect to the mounting surface 10 (and/or any spacer blocks situated between the legs 112 and 114 and the table 10), and to provide some degree of vibration dampening.

Stops are preferably provided on the guide rails 102/104 and/or the frame members 106 so that a circular saw or other power tool (shown in FIG. 2 at 12) may be driven along the lengths of the guide rails 102 and 104 without laterally shifting between the rails 102/104, and to help prevent the cutting head of the power tool 12 from inadvertently being driven into the guide rails 102/104 or frame members 106. Initially, cutting tool end stops 120 on the frame members 106 may interfere with the power tool 12 if a user attempts to move it past the frame members 106, so that a power tool 12 traveling on the guide rails 102/104 is effectively limited to travel between the end stops 120. Further, it is also useful to have at least one of the guide rails 102/104 include a cutting tool side stop 122 which extends above the guide rails 102/104, and against which a power tool 12 may slide as it travels on the guide rails 102/104, thereby better ensuring that a straight cut (one parallel to the rails 102/104) is made, and so that the head of the power tool 12 is not inadvertently driven into the guide rails 102/104.

To assist the user in affixing a board or other workpiece in a desired position in the cutting area 110 when a cut is made (with an exemplary board being depicted at 14 in FIG. 2), the work surface guide 100 preferably includes an elongated board fence 124 (see particularly FIG. 1, and also the detailed depictions of the board fence 124 alone in FIGS. 3 and 4). The board 14 may be slid against the board fence 124 to direct it into the cutting area 110 and into the path of the cutting head of the power tool 12 within the cutting area 110. The board fence 124 is preferably pivotally affixed to the inner guide rail 102 at a fence pivot 126 (here taking the form of a threaded rod 128 extending from the board fence 124, through the inner guide rail 102, and then having a wing nut 130 threaded onto the rod 128 for easy tightening capability). The board fence 124 may therefore swing between the frame members 106 in a plane oriented parallel to the inner and outer guide rails 102 and 104, and above the mounting surface 10 (i.e., in the horizontal plane of the cutting area 110). To better enable the user to determine the angle of a board 14 with respect to the path of the cutting head, an arcuate track 132 is preferably provided as an extension from the inner guide rail 102, and a portion of the board fence 124 spaced away from the fence pivot 126 rides within the arcuate track 132. As best seen in FIGS. 1 and 3–4, the portion of the board fence 124 riding within the arcuate track 132 is here another threaded rod 134, which may have a wing nut 136 provided thereon to allow the board fence 124 to be locked into a desired angular position in relation to the inner guide rail 102. The arcuate track 132 preferably bears angle markings thereon so that the user may readily tell at what angle the board fence 124 is oriented in relation to the inner guide rail 102.

Now referring particularly to FIG. 3 for a more detailed depiction of the board fence 124, the board fence 124 may be formed of a metal or plastic tube having a generally square or rectangular cross-section, so that the board fence 124 has a planar side surface 138 against which a board 14 may slide as it is driven into the cutting area 110. The board fence 124 has an inner end 140 which faces towards the cutting area 110, and an opposing outer end 142 which faces away from the cutting area 110. Each of these ends 140 and 142 is provided with one or more extensions which enhance the utility of the board fence 124, as will be discussed at greater length below.

Initially, the inner board fence end 140 is adapted to slidably receive a sacrificial elongated cut guide fence member 144 therein, thereby allowing the cut guide fence member 144 to be adjustably extended into the cutting area 110 from the board fence inner end 140 (or entirely retracted within the inner board fence end 140, if desired). Where the board fence 124 is defined as a tubular member having an open inner end 140, this open inner end 140 is preferably sized and configured such that it can telescopically receive a length of some commonly-sized stock lumber (or some other common, relatively inexpensive, and easily cuttable material) to serve as the cut guide fence member 144. For example, the board fence 124 might be sized to telescopically receive a length of 1×1 lumber, 1×2 lumber, or 2×4 lumber therein. When the cut guide fence member 144 is received within the board fence 124, it will swing with the board fence 124 within the cutting area 110, and will effectively extend the board fence 124 into the cutting area 110. During cutting, the end of the cut guide fence member 144 may be cut off, and its cut end will serve to indicate to the user where any subsequent cuts will be made on a board 14 resting against the board fence 124. Thus, when a user wants a board 14 cut at a specific location, the user can simply situate the board 14 against the side surface 138 of the board fence 124 so that the desired cutting location is aligned with the cut end of the cut guide fence member 144, and the user may then drive the power tool 12 across the guide rails 102 and 104 to cut the board 14 at the desired location. When the user wishes to realign the board fence 124 to a different angle (such that the cut end of the cut guide fence member 144 will no longer accurately indicate the path of travel of the cutting head), the user may simply pull an additional length of the cut guide fence member 144 from the board fence 124 so that the end of the cut guide fence member 144 may again be cut off to indicate the location of subsequent cuts. Some means for releasibly locking the cut guide fence member 144 with respect to the board fence 124 is preferably provided, and as best seen in FIGS. 3 and 4, this may take the form of a thumbwheel 146 which has a threaded member (not shown) extending therefrom through the wall of the board fence 124 to engage the cut guide fence member 144. Thus, the thumbwheel 146 may be actuated to releasibly engage the cut guide fence member 144 within the board fence 124 once it is extended from the board fence 124 by some desired length.

At the board fence outer end 142, an extension fence member 148 is adjustably extendible from the outer end 142, as can be seen by comparing FIG. 3 (wherein the extension fence member 148 is retracted in the board fence 124) and FIG. 4 (wherein the extension fence member 148 is extended from the board fence 124). Such an arrangement may be provided by forming the extension fence member 148 of an inner telescoping section 150 (see FIG. 4) sized to be slidably received within the board fence 124, and an outer surface member 152 sized to fit over the inner telescoping section 150. The outer surface member 152 of the extension fence member 148 is preferably sized to have an extension fence member side surface 154 which is coplanar with the board fence side surface 138, so that any board 14 sliding along the board fence side surface 138 and extension fence member side surface 154 will smoothly slide in a straight path towards the cutting area 110. As with the cut guide fence member 144, a thumbwheel 156 may be provided to extend through the board fence 124 and engage the extension fence member 148 at its inner telescoping section 150 to allow the extension fence member 148 to be fixed at some desired degree of extension from the board fence 124. The user may therefore extend the extension fence member 148 with respect to the board fence 124 to some desired length to accommodate a longer board 14 to be cut, and may affix the extension fence member 148 in place for that or subsequent boards (or may retract the extension fence member 148 when desired).

Since it can sometimes be useful to restrain an end of the board 14 prior to beginning cutting operations, the board fence 124 preferably includes a fence board stop 158 which extends from the board fence side surface 138, thereby deterring any board 14 resting against the board fence side surface 138 from displacing along the length of the board fence 124 during cutting. The fence board stop 158 is preferably relocatable along the length of the board fence 124 (and its extension fence member 148) to better accommodate boards 14 of different lengths (with FIGS. 3 and 4 showing the fence board stop 158 in different locations). In FIGS. 3 and 4, the fence board stop 158 is depicted as a strip-like metal fence board stop body 160 which is slidably received in the extension fence outer surface member 152 and the board fence 124 adjacent the extension fence inner telescoping section 150, and a protruding fence board stop heel 162 joined to the body 160 at a converging neck 164. A slot 166 is then formed in the board fence 124 and the extension fence outer surface member 152 which allows the fence board stop body 160 to be slid to different locations along the board fence 124 and extension fence member 148, while still allowing the fence board stop heel 162 to protrude directly from the extension fence member side surface 154 (or board fence side surface 138). A thumbwheel 168 extends through the outer surface member 152 and inner telescoping section 150 of the extension fence member 148 to releasably engage the body 160 of the fence board stop 158, thereby allowing a user to affix the fence board stop heel 162 at different desired locations. Alternatively and/or additionally, the fence board stop 158 may be locked into a desired location by simply tightening the extension fence member thumbwheel 156 to push the inner telescoping section 150 of the extension fence member 148 against the fence board stop body 160 within the board fence 124 to such a degree that the fence board stop 158 may no longer slide. It is useful to include a stop in the slot 166, or otherwise on the inner board fence end 140 or its surroundings, so that the fence board stop body 160 cannot be pushed past the inner board fence end 140 into the path of the power tool 12. If a user is to cut very long boards 14 (in which case the fence board stop heel 162 may interfere with the length of the board 14 resting along the side surfaces 138 and 154 of the board fence 124, a user may simply slide the entire length of the fence board stop 158 out of the board fence 124 for later replacement and use when shorter boards 14 are to be cut. Alternatively, when the fence board stop 158 is not in use, it may be removed from the board fence 124, rotated 180° about the axis of its body 160, and then reinserted into the board fence 124 (so that the heel 162 rests flush against the end of the extension fence member 148) for easy storage.

Similarly to the fence board stop 158 on the board fence 124, it can sometimes be useful to provide a stop for the opposing end of the board 14 (the one opposite the end resting against the board fence 124). Thus, the work surface guide 100 preferably also includes a board end stop 170 which is generally situated in the planes of the cutting area 110 opposite the mounting surface 10 (i.e., in planes situated between an upper plane defined by the guide rails 102 and 104 and a lower plane defined by the mounting surface 10), with the board end stop 170 extending in a direction oriented between the frame members 106 and at least substantially parallel to the outer guide rail 104. In FIG. 1, the board end stop 170 is depicted as having end stop slides 172 slidably received within end stop collars 174 provided on the frame members 106. The end stop collars 174 include thumbwheels 176 having threaded members (not shown) protruding through the end stop collars 174 onto the end stop slides 172, whereby a user may adjust the thumbwheels 176 to lock the slides 172 at some desired degree of extension within the end stop collars 174. The end stop slides 172 are joined by a stop member 178, which may (if desired) have an enlarged blocking plate 180 defined thereon to better serve as a stop for a board 14 extending from the board fence 124, through the cutting area 110, and onto the stop member 178.

Thus, referring particularly to FIG. 2, it is seen that a user may affix the work surface guide 100 to a mounting surface 10 at its frame member attachment ends 108; situate a desired power tool 12 on the guide rails 102/104 to ride thereon between the frame members 106; and move the power tool 12 between the frame members 106 and through the cutting area 110 to cut the end of the cut guide fence member 144. Once the cut guide fence member 144 is cut at the cutting head of the power tool 12, it will indicate to a user the exact location where the power tool 12 will make its next cut (provided the next cut is made under the same conditions as the first). The user may then situate a board 14 against the side surface 138 (shown in FIG. 1) of the board fence 124 so that one end of the board 14 is aligned with the cut end of the cut guide fence member 144 (i.e., along the path of travel of the cutting head of the power tool 12), and may then abut the heel 162 of the fence board stop 158 (also shown in FIG. 1) against the opposite end of the board 14 to better restrain it in place during cutting. After the board 14 is cut, it may be removed, and an uncut board 14 may be put in its place against the side surface 138 of the board fence 124, and against the heel 162 of the fence board stop 158, if the second board 14 is to be cut with the same length and configuration as the first board 14. The user is thereby able to rapidly and easily make repeated identical saw cuts of boards 14 or other pieces to desired lengths. Since the work surface guide 100 is easily removable from the mounting surface 10, it can be used in different locations to which the transport of a fixed-bed cutting tool would be impractical.

Note that a preferred version of the invention is shown and described above to illustrate different possible features of the invention and the varying ways in which these features may be combined. Apart from combining the different features of the foregoing versions in varying ways, other modifications are also considered to be within the scope of the invention. Following is an exemplary list of such modifications.

Initially, the work surface guide 100 may take a wide variety of forms other than the one illustrated. While the guide rails 102/104 are shown as being integrally formed with the frame members 106, the cutting tool end stops 120, the cutting tool side stop 122, etc. (a form which might be useful where these pieces are to be integrally molded, e.g., from thermosetting plastics), it should be understood that these parts could instead be separately formed of metals, plastics, wood, or other materials, and then affixed together by fasteners, welding, or other attachment means. In this respect, the rails 102/104 might be made affixable to the frame members 106 at various locations along their length (e.g., by extending bolts through the rails 102/104 and into the frame members 106) so that the frame members 106 might be more closely spaced together when the work surface guide 100 is to be mounted to a smaller mounting surface 10.

Similarly, the various components of the work surface guide 100 need not have the same configuration and relative sizes as the ones illustrated in the Figures; for example, the board end stop 170 might simply have a single end stop slide 172 (e.g., the one illustrated at the right side of FIGS. 1 and 2), with the stop member 178 extending therefrom to terminate in the blocking plate 180, and with the remainder of the stop member 178 being eliminated. In similar fashion, various components may be replaced by different components having the same functions; for example, the sliding and locking arrangements provided between the board fence 124 and its cut guide fence member 144, extension fence member 148, and fence board stop 158 may take a wide variety of forms other than the ones illustrated, and members might slide adjacent each other rather than in telescopic relation to each other, with the members being restrained to adjacently slide by the use of brackets, sliding interlocking structure (e.g., dovetail tongue-and-groove arrangements), or other arrangements.

The work surface guide 100 is not limited to the use of power tools 12 in the form of circular saws, and other power tools (jigsaws, routers, etc.) can be accommodated. Additionally, such power tools 12 need not travel directly on the guide rails 102 and 104, and might instead ride on a carriage which bears rollers or which is otherwise slidably provided atop the rails 102/104. If desired, such a carriage might be slidably affixed to the guide rails 102/104, so that it is not easily removed therefrom. If desired, the guide rails 102/104 might contain channels for carriage rollers to ride in.

Additional features can be added to the work surface guide 100. A support member (rigid beam, rod, or other member) could be added to extend from one vertical leg 112 to the other, and/or from one horizontal leg 114 to the other, to add rigidity to the work surface guide 100. The outer guide rail 104 could bear a fence or plate which swings downwardly to protect a user from the blade of the power tool 12 after a cut has been made.

A work light could be added to some portion of the work surface guide 100, and it could extend from a flexible stem to allow the light to be reoriented to an area of interest to better view cutting operations. An electrical socket could be added to the work surface guide 100 so that the power tool 12 may be conveniently plugged into to the work surface guide 100 (with the socket being powered by an extension cord running from the work surface guide 100). The work surface guide 100 could also bear small hooks, eyelets, or clips to which the cord of the power tool 12 might be held, so that the cord is kept readily at hand and/or may be more easily maintained out of the user's way during cutting operations.

The invention is not intended to be limited to the preferred versions of the invention described above, but rather is intended to be limited only by the claims set out below. Thus, the invention encompasses all different versions that fall literally or equivalently within the scope of these claims.

What is claimed is:

1. A work surface guide for power tools comprising:
   a. an elongated inner guide rail;
   b. an elongated outer guide rail aligned at least substantially parallel to the inner guide rail, whereby a power tool may travel on the inner and outer guide rails with a power tool cutting head extending therebetween into a cutting area defined below and between the guide rails;
   c. opposing spaced frame members supporting and extending downwardly from the guide rails to terminate in frame member attachment ends, the frame member attachment ends each defining:
      (1) a downwardly extending vertical leg, and
      (2) a horizontal leg extending from the vertical leg, and also extending away from the inner and outer guide rails,
      whereby each attachment end defines a mounting mouth between its vertical and horizontal legs, the mounting mouth being adapted to receive a corner edge of a mounting surface therein to support the guide rails above the mounting surface with the cutting area located adjacent the corner edge of the mounting surface;
   d. an elongated board fence pivotally affixed to and below the inner guide rail to swing in planes oriented at least substantially parallel to the inner and outer guide rails and between the frame members;
   whereby a board may be placed on the mounting surface and slid thereon against the board fence toward the corner edge of the mounting surface to thereby enter the cutting area, at which point the board may be cut by the cutting head of a power tool traveling on the guide rails.

2. The work surface guide of claim 1 wherein:
   a. the board fence has opposing side surfaces along its length against which a board may slide;
   b. at least one of the side surfaces includes a fence board stop extending therefrom; and
   c. the fence board stop is relocatable along the lengthwise axis of the board fence.

3. The work surface guide of claim 2 wherein the fence board stop is also removable from the board fence.

4. The work surface guide of claim 2 wherein the fence board stop:
   a. slides in a slot oriented along the lengthwise axis of the board fence, and
   b. is removable from the board fence by sliding the fence board stop out on an end of the slot.

5. The work surface guide of claim 1 wherein the board fence includes an elongated cut guide fence member extending therefrom into a cutting area located below and between the inner and outer guide rails, whereby swinging of the board fence swings the cut guide fence member in the cutting area.

6. The work surface guide of claim 5 wherein the cut guide fence member is adjustably extendable with respect to the board fence, whereby the degree of extension of the cut guide fence member into the cutting area may be adjusted.

7. The work surface guide of claim 1 wherein the board fence includes:
   a. an outer end facing away from the cutting area, and
   b. an opposing inner end facing toward the cutting area, the inner end being adapted to slidably receive an elongated cut guide fence member therein, whereby the cut guide fence member may be adjustably extended into the cutting area from the inner end of the board fence.

8. The work surface guide of claim 7 wherein the board fence has opposing side surfaces along its length against which a board may slide, and wherein at least one of the side surfaces includes a fence board stop extending therefrom.

9. The work surface guide of claim 8 wherein the fence board stop is relocatable along the lengthwise axis of the board fence.

10. The work surface guide of claim 1 wherein the board fence includes:
 a. an inner end facing toward the cutting area, and
 b. an opposing outer end facing away from the cutting area, the outer end having an extension fence member thereon, wherein the extension fence member is adjustably extendable from the outer end along the lengthwise axis of the board fence.

11. The work surface guide of claim 10:
 a. wherein the board fence and extension fence member together define an at least substantially planar side surface against which a board may slide, the side surface being oriented at least substantially perpendicular to a plane defined by the guide rails;
 b. further comprising a fence board stop extending from the side surface.

12. The work surface guide of claim 11 wherein the fence board stop is relocatable along the side surface.

13. The work surface guide of claim 1 wherein the board fence includes:
 a. an inner end facing toward the cutting area, the inner end being adapted to slidably receive an elongated cut guide fence member therein, whereby the cut guide fence member may be adjustably extended along the lengthwise axis of the board fence into the cutting area from the inner end of the board fence;
 b. an opposing outer end facing away from the cutting area, the outer end having an extension fence member thereon, wherein:
  (1) the extension fence member is relocatable along the lengthwise axis of the board fence,
  (2) the board fence and extension fence member together define an at least substantially planar side surface against which a board may slide, the side surface being oriented at least substantially perpendicular to a plane defined by the guide rails,
 and wherein the board fence further includes a fence board stop extending from the side surface.

14. The work surface guide of claim 13 wherein the fence board stop is relocatable along the lengthwise axis of the board fence.

15. The work surface guide of claim 1 wherein the frame members define cutting tool end stops extending above the guide rails, whereby a power tool traveling on the guide rails travels between the cutting tool end stops.

16. The work surface guide of claim 15 wherein at least one of the guide rails includes a cutting tool side stop defined thereon, the cutting tool side stop extending above the guide rails, whereby a power tool traveling on the guide rails travels adjacent the cutting tool side stop.

17. The work surface guide of claim 1 further comprising an elongated board end stop:
 a. situated in planes oriented between an upper plane defined by the guide rails and a lower plane defined by the horizontal legs of the frame members,
 b. oriented at least substantially parallel to the outer guide rail,
 c. extending in a direction oriented between the frame members, and
 d. having adjustable spacing from the outer guide rail.

18. A work surface guide for power tools comprising:
 a. an inner guide rail;
 b. an outer guide rail aligned at least substantially parallel to the inner guide rail, whereby a power tool may travel on the inner and outer guide rails with a power tool cutting head extending therebetween;
 c. spaced frame members supporting and extending downwardly from the guide rails to terminate in frame member attachment ends, the frame member attachment ends being adapted to affix to a mounting surface to support the guide rails in a plane spaced above the plane of the mounting surface;
 d. an elongated board fence pivotally affixed with respect to the inner guide rail to swing in planes oriented at least substantially parallel to the inner and outer guide rails, the board fence including a cut guide fence member extending therefrom into a cutting area located below and between the inner and outer guide rails, whereby swinging of the board fence swings the cut guide fence member in the cutting area.

19. The work surface guide of claim 18 wherein the board fence includes:
 a. an outer end facing away from the cutting area, and
 b. an opposing inner end facing toward the cutting area, the inner end having the cut guide fence member slidably mounted thereon, whereby the cut guide fence member may be adjustably extended into the cutting area from the inner end of the board fence.

20. A work surface guide for power tools comprising:
 a. an elongated inner guide rail;
 b. an elongated outer guide rail aligned at least substantially parallel to the inner guide rail, whereby a power tool may travel on the inner and outer guide rails with a power tool cutting head extending therebetween into a cutting area defined below and between the guide rails;
 c. spaced frame members supporting and extending downwardly from the guide rails to terminate in frame member attachment ends, the frame member attachment ends being adapted to affix to a mounting surface to support the guide rails in a plane spaced above the plane of the mounting surface;
 d. an elongated board fence pivotally affixed with respect to the inner guide rail to swing in planes oriented at least substantially parallel to the inner and outer guide rails, the board fence including:
  (1) an outer end facing away from the cutting area, and
  (2) an opposing inner end facing toward the cutting area, the inner end being adapted to slidably receive an elongated cut guide fence member therein, whereby the cut guide fence member may be adjustably extended into the cutting area from the inner end of the board fence.

* * * * *